(12) United States Patent
Reichardt

(10) Patent No.: US 6,176,339 B1
(45) Date of Patent: Jan. 23, 2001

(54) MOTORCYCLE HAVING ACCESSORIES MOUNTED UNDER A TRIPLE CLAMP

(75) Inventor: Douglas D. Reichardt, West Bend, WI (US)

(73) Assignee: Harley-Davidson Motor Company, Milwaukee, WI (US)

(*) Notice: Under 35 U.S.C. 154(b), the term of this patent shall be extended for 0 days.

(21) Appl. No.: 09/365,310

(22) Filed: Jul. 30, 1999

(51) Int. Cl.[7] ................................................. B62D 61/02
(52) U.S. Cl. ...................... 180/219; 280/280; 280/304.5; 296/78.1; 224/413
(58) Field of Search ........................... 180/219; 280/276, 280/279, 280, 288.4, 304.5; 74/551.8; 224/413, 420, 424, 436, 425, 412, 419, 421; 296/78.1

(56) References Cited

U.S. PATENT DOCUMENTS

| | | | |
|---|---|---|---|
| 444,089 | * | 1/1891 | Lamson . |
| 752,004 | * | 2/1904 | Simons . |
| 3,964,765 | * | 6/1976 | Zenser .................................. 280/276 |
| 3,989,261 | * | 11/1976 | Kawaguchi ........................... 280/276 |
| 4,201,398 | * | 5/1980 | Meier ................................ 280/289 L |
| 4,313,548 | * | 2/1982 | Edelson ................................... 224/36 |
| 4,373,741 | * | 2/1983 | Resele et al. ........................ 280/280 |
| 4,687,072 | * | 8/1987 | Komuro ................................. 180/219 |
| 4,700,963 | * | 10/1987 | Burns et al. .......................... 180/219 |
| 5,092,421 | * | 3/1992 | Tsurumaki et al. ................... 280/279 |

FOREIGN PATENT DOCUMENTS

229788 * 9/1989 (JP) ..................................... 280/280

OTHER PUBLICATIONS

1999 Custom Chrome Catalog—pp. 2.21, 15.26–15.30.
1994 Uniquely V–twin Manufacturing Catalog—pp. 210–212 and 220.
1993 and 1994 Official Factory Service Manual, XLH—p. 2–46.

* cited by examiner

Primary Examiner—Daniel G. DePumpo
(74) Attorney, Agent, or Firm—Michael Best & Friedrich LLP

(57) ABSTRACT

The present invention directed to a motorcycle that includes a frame, a steering fork, a triple clamp and a motorcycle accessory mounted to a bottom surface of the triple clamp. The triple clamp rotatably couples the motorcycle frame to a pair of fork tubes that are part of the steering fork such that the steering fork and triple clamp rotate with respect to the motorcycle frame. Mounting a motorcycle accessory to the bottom surface of the triple clamp locates the mounting hardware beneath the triple clamp such that the mounting hardware is hidden from casual viewing. Hidden mounting hardware increases the aesthetic appearance of a motorcycle.

8 Claims, 2 Drawing Sheets

MOTORCYCLE HAVING ACCESSORIES MOUNTED UNDER A TRIPLE CLAMP

FIELD OF THE INVENTION

This invention relates to motorcycles, and more particularly to motorcycle accessory mounts.

BACKGROUND OF THE INVENTION

Motorcycle owners typically place a premium on the aesthetic appearance of their motorcycles. Many owners will secure a variety of motorcycle accessories on different parts of the motorcycle in order to increase the utility and look of a motorcycle. Bags, tool kits, light bars and windshields are among the different accessories that can be mounted to a motorcycle.

Triple clamps are one of the parts on a motorcycle where accessories are commonly attached. The triple clamps rotatably couple the frame of the motorcycle with a pair of fork tubes on the steering fork. The fork tubes extend through the triple clamps and one end of each fork tube is connected to opposite sides of the front wheel axle. Handlebars are coupled to the upper end of the fork tubes. A driver steers the motorcycle by maneuvering the handlebars, which causes the fork tubes, front wheel and triple clamps to rotate with respect to the frame of the motorcycle. The motorcycle accessories are usually mounted on a front, or top, surface of one, or both, of the triple clamps so that an accessory is readily visible and easily accessible.

SUMMARY OF THE INVENTION

Mounting motorcycle accessories to the front or top surface of either triple clamp causes the mounting hardware (e.g., bolts, nuts etc.) that is used to secure the accessory to the motorcycle to be clearly visible. Visible mounting hardware on a motorcycle diminishes the aesthetic appeal of the motorcycle. This is particularly true when no accessories are mounted, and only the fastener or a threaded hole is visible.

The present invention alleviates the above-noted problem by providing a motorcycle that includes a frame, a steering fork, a triple clamp and a motorcycle accessory mounted to a bottom surface of the triple clamp. The triple clamp rotatably couples the frame to a pair of fork tubes that are part of the steering fork such that the steering fork and triple clamp rotate with respect to the motorcycle frame.

Mounting a motorcycle accessory to the bottom surface of the triple clamp locates the mounting hardware beneath the triple clamp such that the mounting hardware is hidden from casual viewing. Concealing mounting hardware (e.g., nuts, bolts, etc.) on a motorcycle enhances the image of the motorcycle.

Other principal features and advantages of the invention will become apparent to those skilled in the art upon review of the following drawings, detailed description and the attached claims.

DETAILED DESCRIPTION

Figure 1:
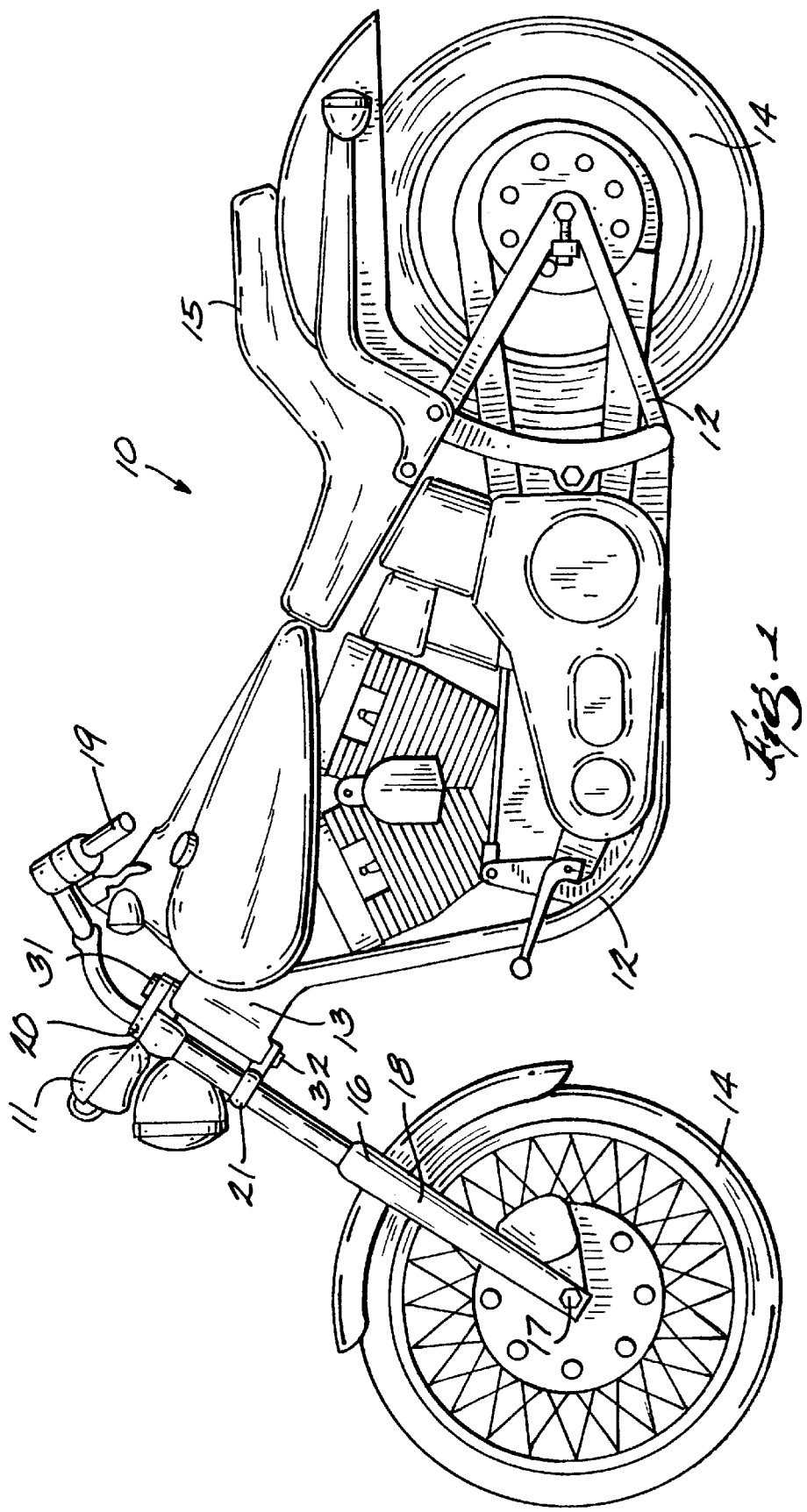
FIG. 1 is a side view of a motorcycle embodying the present invention.

FIG. 1 illustrates a motorcycle 10 embodying the present invention. The motorcycle 10 includes a frame 12, wheels 14, seat 15 and a steering fork 16 that is rotatably coupled to the frame 12 using an upper triple clamp 20 and a lower triple clamp 21. The steering fork 16 includes a pair of fork tubes 18 (only one of which is visible in FIG. 1) extending through, and secured within, openings in both triple clamps 20, 21 (see e.g., openings 22 in the upper triple clamp 20 of FIGS. 2–4). One end of each fork tube 18 is connected to an opposite side of the front wheel axle 17, and the other end of each fork tube 18 includes a handlebar 19. A motorcycle driver maneuvers the handlebars 19 in order to steer the motorcycle 10. As a driver turns the handlebars 19, the fork tubes 18, the front wheel 14 and both triple clamps 20, 21 rotate relative to the frame 12.

Figure 2:
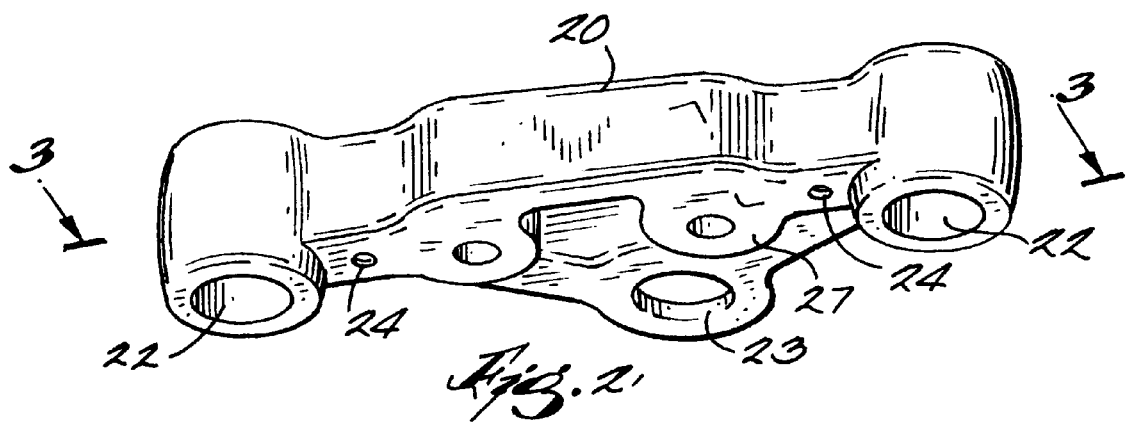
FIG. 2 is a perspective view of a triple clamp that is part of the motorcycle of FIG. 1.
Figure 3:
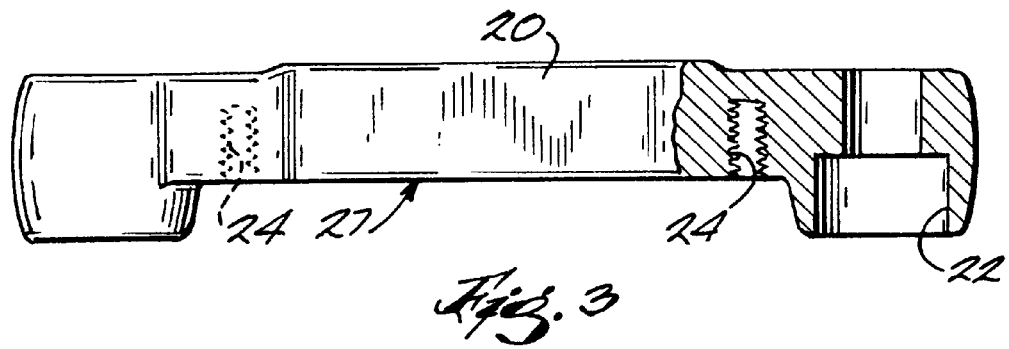
FIG. 3 is a partially sectioned side view of the triple clamp of FIG. 2.
Figure 4:
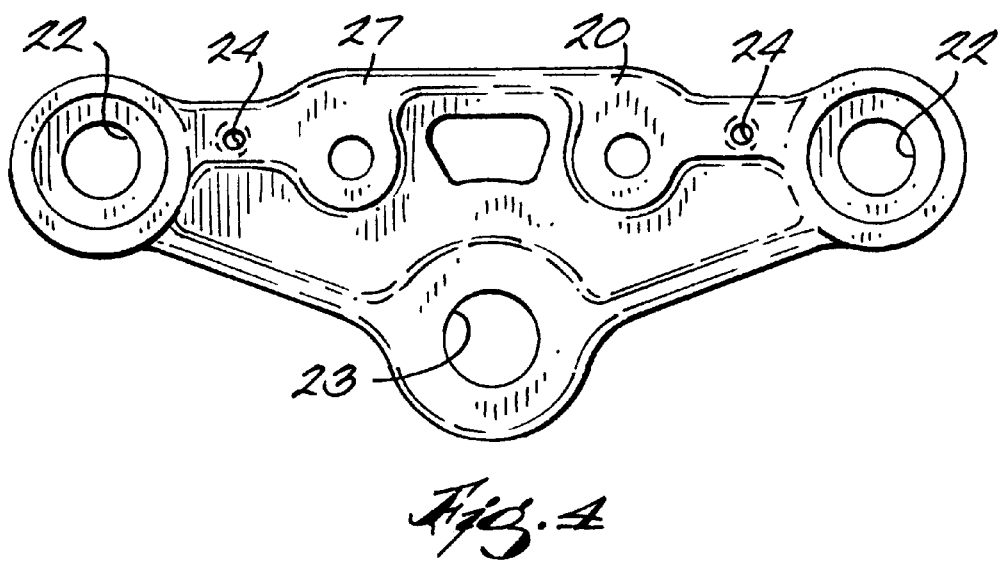
FIG. 4 is a bottom view of the triple clamp of FIG. 2.

In the illustrated embodiment, the frame 12 includes a head tube 13 (not visible in FIGS. 2–4). A fastener 31 extends through an opening 23 in the upper triple clamp 20, the head tube 13 and an opening in the lower triple clamp 21 in order to rotationally secure the steering fork 16 and the triple clamps 20, 21 to the frame 12. Bearings (not shown) are recessed within the head tube 13. The fastener 31 extends through the bearings and bears against the inner races of the bearings as the fastener 31, triple clamps 20, 21 and steering fork 16 rotate relative to the frame 12.

An accessory in the form of a bag 11 is mounted to the bottom surface 21 of the upper triple clamp 20, although it should be understood that the bag 11 could be mounted to the bottom surface of the lower triple clamp 20. Mounting the bag 11 underneath the upper triple clamp 20 keeps the mounting hardware that is used to secure the bag 11 to the upper triple clamp 20 hidden from view.

One form of the upper triple clamp 20 is shown in FIGS. 2–4. The upper triple clamp 20 includes threaded openings 24 in a bottom surface 27. A bag (not shown in FIGS. 2–4) is mounted to the upper triple clamp 20 by inserting conventional fasteners (not shown) through a portion of the bag 11 and then threading the conventional fasteners into the threaded openings 24.

The triple clamp illustrated in FIGS. 2–4 is an upper triple clamp 20, but the threaded openings 24 could also be in the bottom surface of the lower triple clamp 21 without departing from the scope of the present invention. In addition, the openings 22 in the upper triple clamp 20 could be adapted to receive fork tubes 18 with sections having different diameters in order to accommodate different fork tube and handlebar designs on a motorcycle. The opening 23 in the upper triple clamp 20 may be similarly modified for use with different types of fasteners 31.

While the illustrated accessory is a bag 11, it should be appreciated that the accessory of the present invention could be other types of equipment, such as tool kits, light bars and windshields.

The foregoing description of the present invention has been presented for purposes of illustration and description. Furthermore, the description is not intended to limit the invention to the formed disclosed herein. Consequently, variations and modifications commensurate with the above teachings, and the skill or knowledge of the relevant art, are within the scope of the present invention. The embodiments described herein are further intended to explain the best modes known for practicing the invention and to enable others skilled in the art to utilize the invention in such, or other, embodiments and various modifications required by the particular applications or uses of the present invention. It is intended that the appended claims be construed to include alternative embodiments to the extent permitted by the prior art.

What is claimed is:

1. A motorcycle comprising:

a frame;

a steering fork having a pair of fork tubes;

a lower triple clamp rotatably coupled to said frame and connected to said pair of fork tubes such that said fork tubes rotate relative to said frame;

an upper triple clamp having a bottom surface, said upper triple clamp being rotatably coupled to said frame generally above said lower triple clamp and connected to said pair of fork tubes such that said fork tubes rotate relative to said frame; and a motorcycle accessory mounted to said bottom surface of said upper triple clamp.

2. The motorcycle of claim 1 wherein said bottom surface of said upper triple clamp includes a threaded opening, and further comprising a fastener threaded into said threaded opening for securing said motorcycle accessory to said upper triple clamp.

3. The motorcycle of claim 1 wherein said frame includes a head tube that is rotatably coupled to said upper and lower triple clamps.

4. The motorcycle of claim 1 wherein said accessory comprises a bag.

5. A motorcycle comprising:

a frame;

a steering fork having a pair of fork tubes;

a triple clamp having a bottom surface, said triple clamp being rotatably coupled to said frame and connected to said pair of fork tubes such that said fork tubes rotate relative to said frame; and a container mounted to said bottom surface of said triple clamp.

6. The motorcycle of claim 5, wherein said container includes a bag.

7. The motorcycle of claim 6, wherein said container includes a tool kit.

8. A motorcycle comprising:

a frame;

a steering fork having a pair of fork tubes;

a triple clamp having a bottom surface, said triple clamp being rotatably coupled to said frame and connected to said pair of fork tubes such that said fork tubes rotate relative to said frame; and a motorcycle accessory mounted to said bottom surface of said triple clamp, said accessory being one of a bag, a tool kit, a light bar, and a windshield.

\* \* \* \* \*